United States Patent
Ding et al.

(10) Patent No.: US 11,966,073 B2
(45) Date of Patent: Apr. 23, 2024

(54) REFLECTIVE FOUR-IN-ONE LIGHT-EMITTING KEY CORE MODULE

(71) Applicant: Shenzhen Shenshan Special Cooperation Zone HuiChuangDa Electronic Intelligent Technology Co., Ltd, Shenzhen (CN)

(72) Inventors: Jinxin Ding, Shenzhen (CN); Jiawen Zhang, Shenzhen (CN); Maoyu Lin, Shenzhen (CN)

(73) Assignee: Shenzhen Shenshan Special Cooperation Zone HulChuangDa Electronic Intelligent Technology Co., Ltd, Shenzhen (CN)

( * ) Notice: Subject to any disclaimer, the term of this patent is extended or adjusted under 35 U.S.C. 154(b) by 28 days.

(21) Appl. No.: 17/988,945

(22) Filed: Nov. 17, 2022

(65) Prior Publication Data

US 2023/0116154 A1    Apr. 13, 2023

Related U.S. Application Data

(63) Continuation of application No. PCT/CN2021/139179, filed on Dec. 17, 2021.

(30) Foreign Application Priority Data

Oct. 11, 2021    (CN) .......................... 202111324837.8

(51) Int. Cl.
*H01H 13/00*    (2006.01)
*F21V 8/00*    (2006.01)

(52) U.S. Cl.
CPC ......... *G02B 6/0073* (2013.01); *G02B 6/0051* (2013.01); *G02B 6/0088* (2013.01)

(58) Field of Classification Search
CPC ....................................................... H01H 13/83
See application file for complete search history.

(56) References Cited

U.S. PATENT DOCUMENTS

| | | | |
|---|---|---|---|
| 10,444,856 B1* | 10/2019 | Wang ..................... | H01H 13/83 |
| 2011/0073456 A1* | 3/2011 | Chen ..................... | H01H 13/705 |
| | | | 200/5 A |
| 2013/0087440 A1* | 4/2013 | Huang ................... | H01H 13/83 |
| | | | 200/314 |
| 2016/0103272 A1* | 4/2016 | Sun ....................... | G02B 6/0055 |
| | | | 362/631 |
| 2016/0370873 A1* | 12/2016 | Shipman ................ | H01H 13/83 |

* cited by examiner

*Primary Examiner* — Eric T Eide
(74) *Attorney, Agent, or Firm* — Georgi Korobanov

(57) ABSTRACT

A reflective four-in-one light-emitting key core module, wherein an insulating layer is arranged on a support structure, a circuit layer is arranged on the insulating layer, a spacer layer is arranged above the insulating layer, a first through hole is opened in the spacer layer at a position corresponding to the keycap, an elastic conducting member is arranged at the position corresponding to the first through hole, a light-guiding film is arranged above the spacer layer, a conductive sheet is fixedly arranged at a position corresponding to the elastic conducting member, light-guiding mesh points are provided on the light-guiding film, a LED light is arranged on the circuit layer and corresponding to the keycap, a second through hole is opened on the spacer layer corresponding to a position of the LED light, a third through hole is opened on the light-guiding film at a position corresponding to the LED light.

10 Claims, 2 Drawing Sheets

REFLECTIVE FOUR-IN-ONE LIGHT-EMITTING KEY CORE MODULE

CROSS-REFERENCE TO RELATED APPLICATIONS

This application is a U.S. continuation of International Patent Application No. PCT/CN2021/139179, filed on Dec. 17, 2021, which claims the benefit and priority of Chinese Patent Application Number 202111324837.8, filed on Oct. 11, 2021 with China National Intellectual Property Administration, the disclosures of which are incorporated herein by reference in their entireties.

TECHNICAL FIELD

The present application discloses a keyboard structure, in particular a reflective four-in-one light-emitting key core module, which belongs to the technical field of computer peripheral equipment.

BACKGROUND

The keyboard is the most commonly used and the most important input device. Through the keyboard, English letters, Chinese characters, numbers, punctuation marks, etc. can be input into the computer, so as to send commands and input data to the computer. It can be said that since the advent of the computer, the keyboard has been one of the indispensable peripherals of the computer.

With the continuous development of the keyboard, in order to make the keyboard have better use effect, the luminous keyboard (or backlit keyboard) came into being. The keycap is designed as a light-transmitting structure, using the light emitted by the backlight module to illuminate the keycap, which is more suitable for input at night, making it easy to see the words on the keycap, and on the other hand, it will also produce more cool Effect. The light-emitting keyboard structure in the prior art is to set a backlight module inside the keyboard, and the backlight module emits light to illuminate the keycap. The backlight module usually includes a light-shielding film, a light-guiding film, a reflective film and LEDs. The light-shielding film, the light-guiding film and the reflective film are arranged in a stacked manner, the LEDs are arranged on the side of the light-guiding film, and the light emitted by the LEDs is emitted into the light-guiding film and is guided to each keycap through the light-guiding film to be transmitted out to illuminate the keycaps. The current common backlit keyboards have inherent disadvantages due to their structural limitations: (1) Due to the limitation of the backlight module, especially the LED in the backlight module, the thickness of the entire backlight module is more than 0.5 min, which affects the thinning of the entire keyboard; (2) it uses light-guiding film with the structure of LED to emit light, so it is necessary to choose high-power high-brightness LED. On the one hand, the high-power high-brightness LED will cause its power consumption to be too high, resulting in high power consumption. On the other hand, the high-power high-brightness LED generates a lot of heat during use. Since only one or a few LEDs are installed, the heat is concentrated, which will cause problems such as poor heat dissipation and local heating of the keyboard, which will affect the customer's experience, especially when it is used in notebook computers, it will also affect the self-heat dissipation of notebook computers.

SUMMARY

In view of the above-mentioned problems of the light-emitting keyboard in the prior art when the backlight module is used for lighting, that is, the thickness is thick, the power consumption is high, and the heat dissipation is poor, the present application provides a reflective four-in-one light-emitting key core module, which uses a specially-made light-emitting key core module, and uses LEDs corresponding to the key caps to directly illuminate the key cap area, so as to solve the above problems.

The technical solution adopted by the present application to solve its technical problems is: a reflective four-in-one light-emitting key core module, wherein the light-emitting key core module comprises a support structure, an insulating layer, a circuit layer, a spacer layer, a light-guiding film, an elastic conducting member, a LED light and a keycap, wherein the insulating layer is arranged on the support structure, the circuit layer is arranged on the insulating layer, a switch is arranged on the circuit layer at a position corresponding to the keycap, the spacer layer is arranged above the insulating layer, and a first through hole is opened in the spacer layer at a position corresponding to the keycap, the elastic conducting member is arranged at a position corresponding to the first through hole, the light-guiding film is arranged above the spacer layer, and a conductive sheet is fixedly arranged at a position corresponding to the elastic conducting member under the light-guiding film, the conductive sheet is arranged corresponding to the first through hole, and light-guiding mesh points are provided on the light-guiding film at a position corresponding to the keycap, the LED light is arranged on the circuit layer and is arranged corresponding to the keycap, a second through hole is opened on the spacer layer corresponding to a position of the LED light, a third through hole is opened on the light-guiding film at a position corresponding to the LED light, and the LED light is arranged in the second through hole and the third through hole, and the keycap is arranged above the elastic conducting member.

The technical solution adopted by the present application to solve its technical problems further includes:

The support structure is made of a steel sheet, and the thickness of the steel sheet is 0.10 mm-0.25 mm.

The conductive sheet uses silver paste dots.

The insulating layer is fixed with the support structure by an adhesive layer, and the thickness of the insulating layer is 0.02 mm to 0.05 mm.

The thickness of the spacer layer is 0.02-0.07 mm. The thickness of the light-guiding film is 0.08-0.12 mm.

A composite film is arranged above the light-guiding film, and the thickness of the composite film is 0.020~0.30 mm, a lower layer of the composite film is provided with white ink, an upper layer of the composite film is provided with black ink, white ink and black ink are not provided at the position of the composite film corresponding to the keycap, or an opening is arranged on the composite film at a position corresponding to the keycap.

1 to 4 LEDs can be arranged at each keycap.

The elastic conducting member is configured to be an elastic sheet, and the elastic sheet is arranged on the composite film, or the elastic sheet is directly arranged on the light-guiding film.

A scissor foot is arranged between the keycap and the elastic conducting member, wherein the keycap and the scissor foot are respectively arranged on the steel sheet.

The beneficial erects of the present application are: In the present application, the LEDs corresponding to the keycaps are used to directly illuminate the keycap area, so that the backlight module structure is omitted, the thickness of the keyboard can be reduced as a whole, and the lightweight design of the keyboard is more favorable. On the other hand, LEDs are used to directly illuminate the keycap area, and low-power components can be selected for LEDs, which is not only conducive to reducing power consumption, but also reduces its own heat generation. At the same time, due to the distributed arrangement of these LEDs, it is more conducive to heat dissipation, especially in notebook computers, and the heat generated by the notebook itself (mainly the CPU) can also be dissipated through the keyboard.

The present application will be further described below with reference to the accompanying drawings and specific embodiments.

Reference Signs:
1—Steel sheet, 2—Adhesive layer, 3—Insulating layer, 4—Circuit layer, 5—Spacer layer, 6—Light-guiding film, 7—LED light, 8—Elastic sheet, 9—Scissor foot, 10—Keycap, 11—Switch, 12—Conductive sheet, 13—First through hole, 14—Second through hole, 15—Third through hole, 16—Composite film.

DETAILED DESCRIPTION

This embodiment is a preferred embodiment of the present application, and other principles and basic structures that are the same as or similar to those of this embodiment are within the protection scope of the present application.

Figure 1:
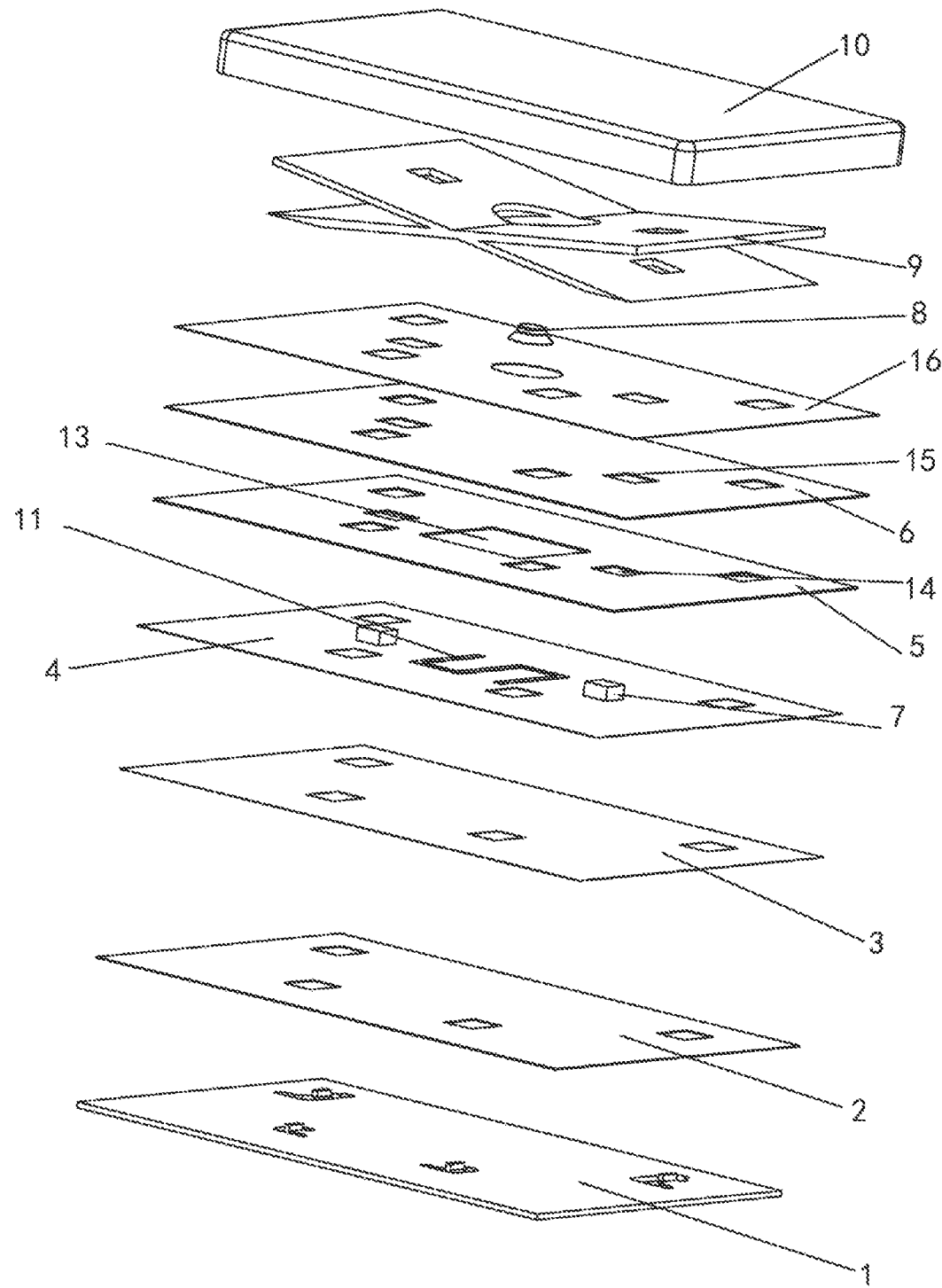
FIG. 1 is a schematic structural diagram of a partial three-dimensional exploded state of a single keycap in the present application.
Figure 2:
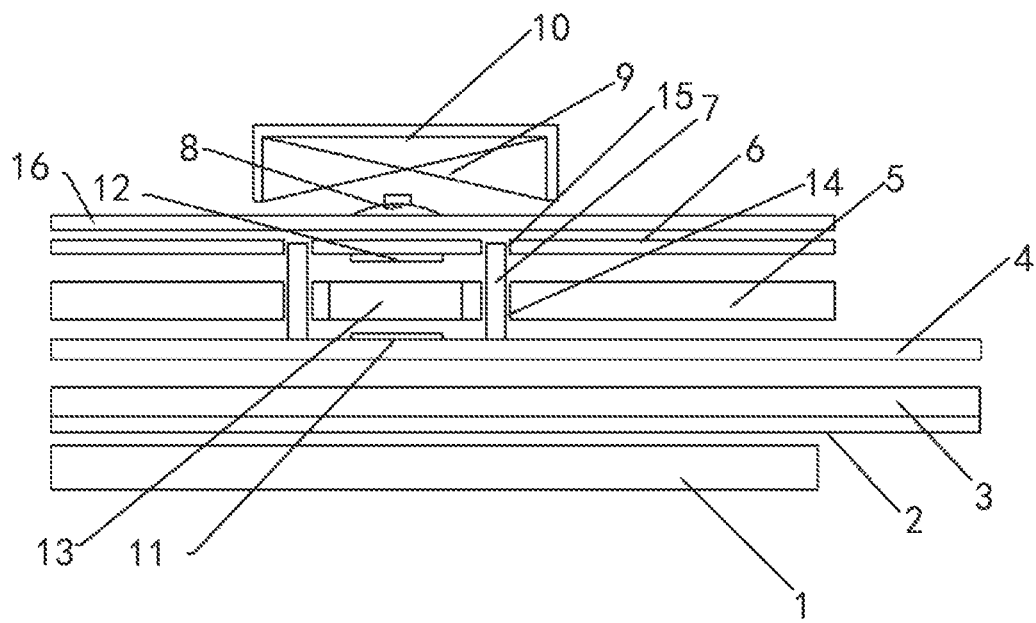
FIG. 2 is a schematic structural diagram of a single keycap in the present application in an exploded state in a partial section.
Figure 3:
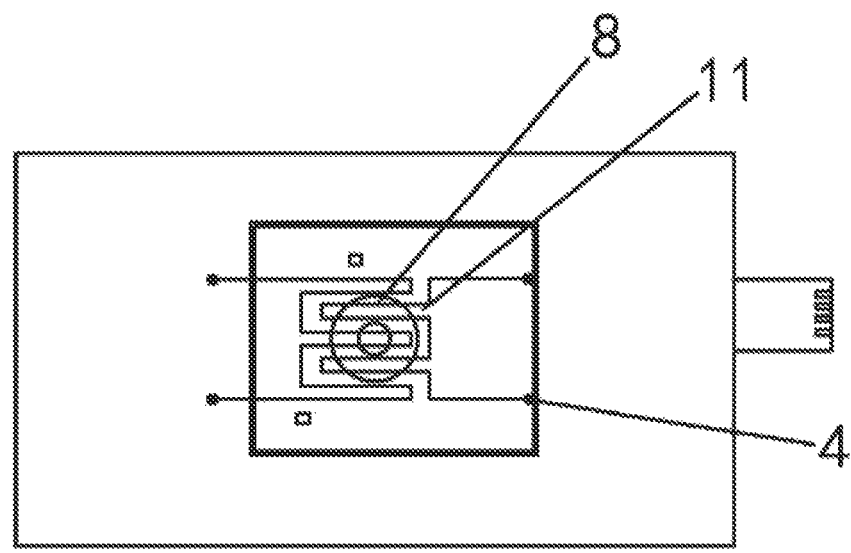
FIG. 3 is a partial top-vie r structural schematic diagram of a single keycap in the present application.

Please refer to accompanying FIGS. 1 to 3. The present application mainly protects a reflective four-in-one light-emitting key core module, which is applied to a light-emitting keyboard. The Figs show the structure at a single keycap of the keyboard, and the structures at each keycap are the same during implementation. The light-emitting key core module comprises a support structure, an insulating layer 3, a circuit layer 4, a spacer layer 5, a light-guiding film 6, an elastic conducting member, a LED light 7 and a keycap 10, wherein the insulating layer 3 is arranged on the support structure, the circuit layer 4 is arranged on the insulating layer 3, the spacer layer 5 is arranged above the insulating layer 4, and a first through hole 13 is opened in the spacer layer 5 at a position corresponding to the keycap 10, the elastic conducting member is arranged at a position corresponding to the first through hole 13, the light-guiding film 6 is arranged above the spacer layer 5, and a conductive sheet 12 is fixedly arranged at a position corresponding to the elastic conducting member under the light-guiding film 6, the conductive sheet 12 is arranged corresponding to the first through hole 13. In other words, the conductive sheet 12 is arranged above the switch 11 correspondingly. In this embodiment, the conductive sheet 12 is formed on the light-guiding film 6 by coating with silver paste dots. Light-guiding mesh points are provided on the light-guiding film 6 at a position corresponding to the keycap 10 (Light-guiding mesh points can be generated by conventional methods such as coating, screen printing, mesh point printing, UV glue or embossing). In this way, the light emitted by the LED light 7 can enter the light-guiding film 6 and then emerge from the light-guiding mesh points, thereby illuminating the keycaps 10, and the LED lamps 7 are arranged on the circuit layer 4 and corresponding to the keycap 10. As a result, the light emitted by the LED light 7 can illuminate the corresponding keycap 10. A second through hole 14 is opened on the spacer layer 5 corresponding to a position of the LED light 7, a third through hole 15 is opened on the light-guiding film 6 at a position corresponding to the LED light 7, that is, the second through hole 14 and the third through hole 15 are stacked and connected to form a through hole, and the LED light 7 is arranged in the second through hole 14 and the third through hole 15. In this embodiment, the thickness of the spacer layer 5 and the light-guiding film 6 is consistent with the thickness of the LED light 7, and the keycap 10 is arranged above the elastic conducting member.

In this embodiment, the supporting structure adopts the steel sheet 1 to facilitate the installation of the entire light-emitting key core module. In a specific implementation, the support structure may also be a keyboard shell or an internal structure of an electronic product (such as a notebook computer, a mobile phone, an e-book, etc.) to which the light-emitting key core module is used. In this embodiment, the thickness of the steel sheet 1 is 0.10 mm~0.25 mm, which can not only meet the strength requirements, but also will not make the overall thickness too thick. When the present application is used in a scissor-foot keyboard, the steel sheet 1 is also provided with installation structures, such as installation holes, hooks, etc., for installing scissors feet and keycaps, etc. Its installation structure is the same as that of a conventional keyboard, which will not be repeated here.

In this embodiment, the insulating layer 3 is made of polyimide insulating material, which is used for attaching and fixing the circuit layer 4. During specific implementation, the insulating layer 3 and the circuit layer 4 may also adopt the FPC structure or other circuit board structures in the prior art. The insulating layer 3 can also be made of other insulating materials that are suitable for attaching the circuit layer 4. The thickness of the insulating layer 3 is 0.02 mm~0.05 mm, which needs to meet the adhesion requirements of the circuit layer 4.

In this embodiment, the insulating layer 3 is fixed with the steel sheet 1 by using the adhesive layer 2. The adhesive layer 2 is preferably a thermosetting adhesive, which is convenient for processing. In specific implementation, materials such as self-adhesive can also be used. The thickness of the adhesive layer 2 is negligible, and it only needs to meet the bonding requirements. Alternatively, during production and processing, the adhesive layer 2 is not provided, and other fixing structures are used to fix the insulating layer 3 and the steel sheet 1 together, or the insulating layer 3 can be directly arranged on the steel sheet 1.

In this embodiment, the circuit layer 4 is a copper foil circuit, which is attached to the insulating layer 3 and can be formed by conventional circuit board processing techniques such as etching, silk screen printing, or pasting. The circuit structure of circuit layer 4 adopts conventional keyboard circuit and conventional LED light driving circuit structure, which is not limited in this application. The circuit layer 4 is provided with a switch 11 at a position corresponding to the keycap, that is, a keyboard key switch, and the switch 11 has the same structure as a conventional keyboard.

In this embodiment, the spacer layer 5 is made of PET (polyethylene terephthalate) material, with a thickness of 0.02 to 0.07 mm, preferably 0.05 mm, and mainly plays an insulating role. In specific implementation, other materials with insulating properties can also be used.

In this embodiment, the light-guiding film 6 is made of PET (polyethylene terephthalate) material, with a thickness of 0.08-0.12 mm, preferably 0.10 mm, and can also be made of other materials during specific implementation.

In this embodiment, a composite film 16 is arranged above the light-guiding film 6 (because it has two functions of reflection and light shading, it is therefore defined as a composite film), and the body of the composite film 16 is made of PET (polyethylene terephthalate) material, the thickness is 0.020~0.30 mm, preferably 0.025 mm and other materials can also be used in specific implementation. The lower layer of the composite film 16 is provided with white ink for reflection, which can reflect the upward light emitted by the LED light 7 back into the light-guiding film 6 to enhance its brightness. The upper layer of the composite film 16 is provided with black ink for shading to prevent light transmission in other areas except the keycap 10, which affects the overall use effect of the keyboard. In this embodiment, the white ink and the black ink are arranged on the composite film 16 by a printing method. In the specific implementation, other methods can also be used, such as spraying, silk-screen printing, and the like. No ink is provided on the composite film 16 at the position corresponding to the keycap 10, so that the light in the light-guiding film 6 can be emitted therefrom to illuminate the keys of the keyboard. During specific implementation, it is also possible to select a film that is white by itself as the composite film 16, and print black ink on the top layer, or select a film that is black by itself, and print white ink on the bottom layer, and a through hole is opened corresponding to the position of the keycap 10, so that the light penetrates.

In this embodiment, the composite film 16 may not be provided, and a black ink layer (not shown in the figure) is provided directly on the light guide film 6. Preferably, the black ink layer is arranged above the light-guiding film 6. The light emitted by the LED light 7 in other directions is absorbed by the black ink layer on the light-guiding film 6, so that it will not be emitted in other directions.

In this embodiment, the LED light 7 uses low-power LEDs, which usually only need to illuminate one keycap, and 1 to 4 LEDs can be arranged corresponding to each keycap 10. Usually, 1 or 2 LED lights 7 can be provided for common keys, while larger and longer keys such as "Enter", "Shift", "Space" need to be provided with 2~4 LED lights 7 correspondingly to meet its illuminating needs. According to actual needs, more LEDs can also be provided corresponding to a keycap. It is also possible to leave no LEDs under the keycaps that do not need to be illuminated.

In this embodiment, the elastic conducting member is selected from the elastic sheet 8, which can also be called a Rubber Dome or a dome piece. In the specific implementation, a rubber or silicone button form can also be used, which mainly plays the role of elastic support and increased hand feeling. In this embodiment, the elastic sheet 8 is installed on the composite film 16. In the specific implementation, if the composite film 16 is not provided, the elastic sheet 8 can also be directly installed on the light-guiding film 6.

In this embodiment, the keycap 10 is arranged above the elastic conducting member, and the keycap 10 adopts a conventional keyboard key structure. In this embodiment, a scissor foot 9 is arranged between the keycap 10 and the elastic conducting member, wherein the keycap 10 and the scissor foot 9 are respectively arranged on the steel sheet 1.

When the application is in use, press the keycap 10, squeeze the scissors foot 9 through the key cap 10, and continue to press down to press the elastic sheet 8, so that the elastic sheet 8 is deformed, and the elastic sheet 8 presses the composite film 16 and the light guide film 6, and then the composite film 16 and the light guide film 6 move downward together with the conductive sheet 12. Through the first through hole 13 on the spacer layer 5, the conductive sheet 12 contacts the switch 11, so that it is turned on, so as to achieve the key effect, release the keycap 10, the scissor foot 9 and the elastic sheet 8 rebound, so that the conductive sheet 12 disengages the switch 11 and makes it disconnect.

In the present application, the LEDs corresponding to the keycaps are used to directly illuminate the keycap area, so that the backlight module structure is omitted, the thickness of the keyboard can be reduced as a whole, and the light-weight design of the keyboard is more favorable. On the other hand, LEDs are used to directly illuminate the keycap area, and low-power components can be selected for LEDs, which is not only conducive to reducing power consumption, but also reduces its own heat generation. At the same time, due to the distributed arrangement of these LEDs, it is more conducive to heat dissipation, especially in notebook computers, and the heat generated by the notebook itself (mainly the CPU) can also be dissipated through the keyboard.

What is claimed is:

1. A reflective four-in-one light-emitting key core module, wherein the light-emitting key core module comprises a support structure, an insulating layer, a circuit layer, a spacer layer, a light-guiding film, an elastic conducting member, a LED light and a keycap, wherein the insulating layer is arranged on the support structure, the circuit layer is arranged on the insulating layer, a switch is arranged on the circuit layer (4) at a position corresponding to the keycap, the spacer layer is arranged above the insulating layer, and a first through hole is opened in the spacer layer at a position corresponding to the keycap, the elastic conducting member is arranged at a position corresponding to the first through hole, the light-guiding film is arranged above the spacer layer, and a conductive sheet is fixedly arranged at a position corresponding to the elastic conducting member under the light-guiding film, the conductive sheet is arranged corresponding to the first through hole, and light-guiding mesh points are provided on the light-guiding film at a position corresponding to the keycap, the LED light is arranged on the circuit layer and is arranged corresponding to the keycap, a second through hole is opened on the spacer layer corresponding to a position of the LED light, a third through hole is opened on the light-guiding film at a position corresponding to the LED light, and the LED light is arranged in the second through hole and the third through hole, and the keycap is arranged above the elastic conducting member.

2. The reflective four-in-one light-emitting key core module according to claim 1, wherein the support structure is made of a steel sheet, and the thickness of the steel sheet is 0.10 mm-0.25 mm.

3. The reflective four-in-one light-emitting key core module according to claim 1, wherein the conductive sheet uses silver paste dots.

4. The reflective four-in-one light-emitting key core module according to claim 1, wherein the insulating layer is fixed with the support structure by an adhesive layer, and the thickness of the insulating layer is 0.02 mm to 0.05 mm.

5. The reflective four-in-one light-emitting key core module according to claim 1, wherein the thickness of the spacer layer is 0.02-0.07 mm.

6. The reflective four-in-one light-emitting key core module according to claim 1, wherein the thickness of the light-guiding film is 0.08-0.12 mm.

7. The reflective four-in-one light-emitting key core module according to claim 1, wherein a composite film is arranged above the light-guiding film, and the thickness of the composite film is 0.020~0.30 mm, a lower layer of the composite film is provided with white ink, an upper layer of the composite film is provided with black ink, white ink and black ink are not provided at the position of the composite film corresponding to the keycap, or an opening is arranged on the composite film at a position corresponding to the keycap.

8. The reflective four-in-one light-emitting key core module according to claim 1, wherein 1 to 4 LEDs can be arranged at each keycap.

9. The reflective four-in-one light-emitting key core module according to claim 1, wherein the elastic conducting member is configured to be an elastic sheet, and the elastic sheet is arranged on the composite film, or the elastic sheet is directly arranged on the light-guiding film.

10. The reflective four-in-one light-emitting key core module according to claim 1, wherein a scissor foot is arranged between the keycap and the elastic conducting member, wherein the keycap and the scissor foot are respectively arranged on the steel sheet.

* * * * *